UNITED STATES PATENT OFFICE

2,251,297

SYNTHETIC RESIN AND PROCESS FOR MAKING THE SAME

Frank J. Soday, Upper Darby, Pa., assignor to The United Gas Improvement Company, a corporation of Pennsylvania No Drawing. Application November 2, 1938, Serial No. 238,384

6 Claims. (Cl. 260—22)

This invention relates to new resinous materials. More particularly, it relates to new resins prepared by the reaction of 4-methyl-Δ4-tetrahydrophthalic acid or its anhydride with polyhydric alcohols.

4-methyl-Δ4-tetrahydrophthalic acid is a dibasic acid having the following structural formula:

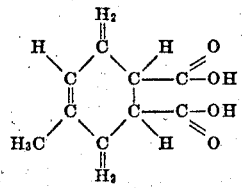

Its anhydride, 4-methyl-Δ4-tetrahydrophthalic anhydride, having the following structural formula,

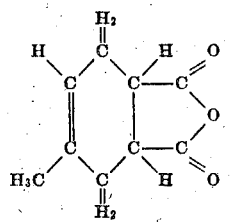

is the equivalent of the acid in the preparation of the resins disclosed herein.

It has now been found that 4-methyl-Δ4-tetrahydrophthalic anhydride or 4-methyl-Δ-4-tetrahydrophthalic acid, or mixtures containing both the anhydride and the acid, may be converted into alkyd resins of excellent quality by reaction with polyhydric alcohols. Polyhydric alcohols are those containing more than one hydroxyl group, such as, for example, ethylene glycol, and glycerol, as well as polyglycols and polyglycerols.

The resins obtained by the reaction of polyhydroxy alcohols with 4-methyl-Δ4-tetrahydrophthalic acid or its anhydride may be classified as (1) non-convertible resins, (2) heat convertible resins, and (3) element convertible resins.

Non-convertible resins are those which remain fusible at all stages but the viscosity of which increases with increase in heating time and/or temperature used in the production of the resins.

The heat convertible resins are those which become infusible and insoluble by heat treatment during or after formation.

The element convertible resins are those which harden into relatively infusible and insoluble products by the addition, usually gradual, of other elements, for example, oxygen from the air.

It has been found that the first two types of these resins may be prepared through the reaction of different polyhydric alcohols with 4-methyl-Δ4-tetrahydrophthalic acid, its anhydride, or mixtures of the acid and the anhydride, and that the third type may be prepared by reacting either of the first two types further, such as with an unsaturated monobasic acid.

It is an object of this invention to provide new synthetic resins of desirable properties. It is a further object of this invention to provide alkyd resins of (1) non-convertible, (2) heat convertible and (3) element convertible types. A further object of this invention is to provide new compositions of matter by the reaction of 4-methyl-Δ4-tetrahydrophthalic acid or its anhydride with polyhydric alcohols. Another object of this invention is to provide resins of desired solubility characteristics, desired acid numbers, desired melting points, desired fluidity or plasticity, desired color, desired compatibility with drying oils, and useful for desired purposes. More specifically, it is an object of this invention to provide new synthetic resins which may be used for molding, casting, mechanical forming or machining operations, for the preparation of desired articles, either alone or in admixture with other resins, and either with or without the use of dyes, pigments, plasticizers, diluents, molding lubricants, fillers, or the like. Other more specific objects of this invention are to provide new resinous compositions which may be used in the textile fields for sizing, waterproofing, the production of crease-proof or wrinkle-proof fabrics, as well as for the production of threads, filaments, wool-like masses, porous objects or masses, and the like. A still further specific object is the provision of new compositions which may be used for insulating purposes, for the preparation of protective and decorative coatings in the form of spirit varnishes, oil varnishes, enamels, lacquers, paints and similar compositions, and the provision of driers for coating compositions. Other objects of this invention will become apparent to those skilled in the art upon becoming familiar herewith.

4-methyl-Δ4-tetrahydrophthalic acid or its anhydride may be obtained in a number of ways.

For example, the anhydride may be prepared through the reaction of isoprene with maleic anhydride. This reaction may be illustrated structurally as follows:

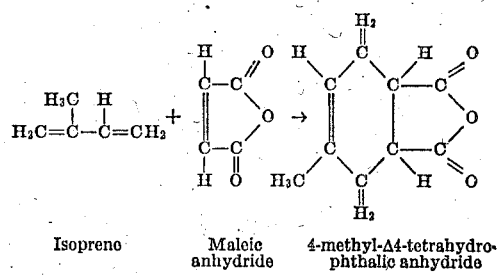

Isoprene     Maleic anhydride     4-methyl-Δ4-tetrahydrophthalic anhydride

The anhydride may be readily hydrolyzed to form the corresponding acid, 4-methyl-Δ4-tetrahydrophthalic acid, for instance by mixture with water.

Illustrative of the reaction by which 4-methyl-Δ4-tetrahydrophthalic anhydride may be prepared is the example given below as Example 1.

Isoprene, or hydrocarbon fractions containing any portion of isoprene may be used to react with maleic anhydride. The isoprene may be obtained synthetically, by the pyrolysis of rubber, or from fractions obtained by condensation in the manufacture of carburetted water gas, oil gas, refinery gas, or coke oven gas, or from similar sources. Such fractions will be referred to herein generally as light oil fractions.

For example, a sample of light oil obtained in the manufacture of oil gas under certain conditions, may be fractionated to obtain a cut containing say from 30 to 90% isoprene, in addition to various quantities of other unsaturated hydrocarbons. Cyclopentadiene and perhaps similar unsaturated hydrocarbons which may be present in an isoprene fraction may, if desired, be removed among other ways by heating the material, say at 100° C. in a closed vessel for several hours, followed by the distillation of the unchanged isoprene from the polymers thus formed. Piperylene may also be present. While a concentration of isoprene of at least 30% is preferred, lower concentrations may be employed.

The isoprene or isoprene fraction may be reacted with maleic anhydride or maleic acid or mixtures of these to produce 4-methyl Δ4-tetrahydrophthalic anhydride by warming a mixture of the reagents. The reactants may be mixed say in substantially molar quantities and allowed to react at room temperatures or at elevated temperatures until substantially complete conversion has been obtained.

A preferred embodiment of effecting the reaction is to mix the reactants and allow the mixture to stand at room temperature for a period of time, followed by heating to a temperature of approximately 60° C. for a relatively short period of time.

However, the process is not restricted to the use of any definite heating time or temperature.

The reactants may be combined as such, or in solution form in a suitable solvent or solvents. Suitable solvents for this purpose include aromatic hydrocarbons, chlorinated solvents, esters, ethers, and the like.

4-methyl-Δ4-tetrahydrophthalic anhydride is obtained in good yield as a result of this reaction. The anhydride may be readily hydrolyzed to 4-methyl-Δ4-tetrahydrophthalic acid if desired as above pointed out.

Illustrative of one of the methods of preparation of 4-methyl-Δ4-tetrahydrophthalic anhydride is the following example:

EXAMPLE 1

A portion of an isoprene cut obtained by the fractionation of light oil, and containing 90 parts by weight of isoprene was mixed with 100 parts of maleic anhydride. This mixture was then dissolved in 260 parts of benzene, placed in an autoclave and allowed to stand for approximately 45 hours at room temperature. It was then heated to 60° C. for a period of 6 hours with agitation. At the end of this period it was cooled to 0° C. and filtered. There was obtained a mass of crystals corresponding to approximately 105 parts by weight. A further quantity of crystals, amounting to approximately 45 parts by weight was obtained by recrystallization from the filtrate. These crystals, totalling approximately 150 parts by weight, were found to be a highly purified form of 4-methyl-Δ4-tetrahydrophthalic anhydride.

Resin formation

The formation of the herein described resins is in general carried out by mixing the 4-methyl-Δ4-tetrahydrophthalic acid or its anhydride with a polyhydric alcohol and heating at a temperature sufficient to effect condensation of the reactants.

In general, it has been found preferable to employ 4-methyl-Δ4-tetrahydrophthalic anhydride instead of the acid, although the latter may also be used with good results.

The heating is continued until a resin of the desired consistency or degree of hardness is obtained. The temperature and time of reaction will vary with the particular alcohol used and with the nature of the resin desired. In general, a temperature approximating the boiling point of the alcohol is preferably employed, because this affords a close control of temperature, the volatilized materials being condensed and returned to the sphere of the reaction.

Higher temperatures may be used if desired by the application of sufficient pressure to prevent excessive volatilization of any of the reactants. As an example, the materials may be heated in a closed container.

The characteristics of the finished resin will vary with the heating time and the temperature employed. A longer period of heating or a higher reaction temperature, or both, will result in the production of a resin of increased viscosity.

Solubility of the resultant resin in organic solvents may be decreased and hardness increased by an increase in length of heating time or an increase in the reaction temperature, or both.

Solubility may, on the other hand, be increased by modifying the resins in a manner to be described hereinafter.

The proportions of the reactants used to produce the herein described resins may be varied over very wide limits. The resins formed by the reaction are removed from the unreacted portions of either component at the end of the desired reaction period, preferably by distillation, although other separation methods may be employed.

Catalysts, or other modifying agents, such as retarding agents, may be used to accelerate or retard the rate of reaction if desired.

Examples of catalysts are sulfonic acids, such as benzene sulfonic acid, 1-naphthylamine-4-sulfonic acid, and 4-aminotoluene-2-sulfonic acid, metallic soaps, such as cobalt linoleate, lead oleate, and aluminum stearate, and contact materials such as silica gel.

Examples of retarding agents are naphthalene, tetrachloro-naphthalene, boric acid, urea, or thiourea.

As above pointed out, three general types of resinous compounds may be prepared in accordance with this invention.

Non-convertible resins

A series of resins which are preponderantly of the non-convertible type may, in general, be prepared by the reaction of dihydroxy alcohols, that is organic compounds containing only two hydroxyl groups, with either 4-methyl-Δ4-tetrahydrophthalic acid or its anhydride or both.

Examples of glycols which may be used are ethylene glycol, propylene glycol, trimethylene glycol, alpha butylene glycol, beta butylene glycol, butandiol-1,3 tetramethylene glycol and similar compounds.

Examples of polyglycols which may be used are diethylene glycol, triethylene glycol, tetraethylene glycol, and higher members of the series, as well as polyglycols prepared from glycols other than ethylene glycol.

Examples of substituted polyhydroxy alcohols having two hydroxy groups and polymeric forms thereof that may be used are glycerol monomethyl ethers, 1-chloropropandiol-2,3, glycerol monoethyl ether, α-glycerol phenyl ether, tetrahydrofurfuryl ether of glycerol and polyglycerolmonomethyl ether.

The modified glycols, named polyglycols and polymeric substituted glycols, may be used as such or they may be generated in situ. This applies as well to any of the alcohols to which this invention relates.

The products obtained when dihydroxy alcohols are employed are, in general, flexible, and are compatible with plastics such as nitrocellulose and cellulose acetate plastics. They may, therefore, be used, among other things, to improve the gloss and adhesion of lacquers containing one or both of these materials.

Mixtures of any of the foregoing alcohols may be employed, if desired.

Illustrative of the preparation of a new resin through the reaction of 4-methyl-Δ4-tetrahydrophthalic acid or its anhydride and a glycol, is the following example:

EXAMPLE 2

A mixture of 6.8 parts of ethylene glycol and 16.6 parts of 4-methyl-Δ4-tetrahydrophthalic anhydride was placed in a closed container provided with a reflux condenser and heated for a period of 7 hours at a temperature of 290° C.

The product was a solid alkyd-type resin, light yellow in color and slightly tacky. It is readily incorporated in standard paint or varnish formulations.

Heat convertible resins

A series of resins which are preponderantly of the heat convertible type may be prepared by the reaction of 4-methyl-Δ4-tetrahydrophthalic acid or its anhydride with alcohols containing more than two hydroxyl groups per molecule.

Glycerol is an important member of this series due to its ready availability and comparatively low cost.

Examples of other alcohols which may be used to prepare this type of resin are the following: pentaerythritol, sorbitol, mannitol, butanetriol-1,2,3, and similar compounds as well as polymeric forms thereof including the polymeric forms of glycerol, namely polyglycerols.

It has been found that the resins prepared through the use of polyglycerols have, in general, the same physical properties as those prepared from normal glycerol.

The polyglycerols may be prepared by heating glycerol for a suitable period of time, either with or without the addition of a suitable catalyst such as sodium hydroxide.

Substituted polyhydroxy alcohols having three or more hydroxy groups, and polymeric forms thereof, may also be employed. An example of such an alcohol is mono butyl erythritol.

Mixtures of any of the foregoing alcohols may be employed, if desired.

Illustrative of the preparation of this type of resin are the following examples:

EXAMPLE 3

A portion of 4-methyl-Δ4-tetrahydrophthalic anhydride corresponding with approximately 80 parts by weight was mixed with approximately 30 parts by weight of glycerine. The mixture was rapidly heated to a temperature of approximately 290° C. and held at this point for a period of 7 hours. There was obtained as a product, a light colored resin of medium consistency.

This resin was tested in various coating compositions and was found to possess very good coating properties. It produced a film which retained the properties of the original resin and which became hardened by the application of heat.

EXAMPLE 4

A quantity equivalent to 40 parts by weight of 4-methyl-Δ4-tetrahydrophthalic anhydride was mixed with 15 parts by weight of glycerine. The mixture was heated to a temperature of approximately 290° C. and held at this point for a period of 17 hours.

The resin obtained from this reaction was found to be a light-colored, high melting product which was particularly suitable for use in coating compositions and as an ingredient in molding powders.

Element convertible resins

A series of resins which are preponderantly of the element convertible type may be prepared from the resins so far described. The resins of this series harden in most instances quite rapidly and become relatively infusible and insoluble on exposure to the air. The majority of these resins are of the oxygen convertible type which harden by the gradual addition of oxygen from the air. The others for the most part harden by gradual addition of other constituents present in atmospheric air.

The element convertible resins may be prepared by modifying the foregoing alkyd resins by the addition of unsaturated monobasic acids. A methyl tetrahydrophthalic acid resin, such as those the preparation of which has already been described, will react with unsaturated monobasic acids, and particularly those contained in drying oils, with the resultant formation of a compound containing the drying oil component in chemical combination with the resin molecule.

Either the drying oils themselves or the drying oil fatty acids may be used for this purpose.

Examples of drying oil fatty acids are: linoleic acid, eleostearic acid, and fatty acids derived from soya bean oil, oiticica oil, walnut oil, tung oil, linseed oil, rubberseed oil, and similar vegetable drying oils. It has been found that a mixture of a drying oil and one or more fatty acids derived from drying oil can be more readily incorporated with the methyl tetrahydrophthalic acid resin than either of the components taken alone. The fatty acid derived from the same drying oil is preferred. However, any mixture of drying oils, or any mixture of fatty acids, or both, may be employed without departing from the broad concept of the invention.

The drying oil, the unsaturated fatty acid, or their mixture may be incorporated with the resin at any stage that is before, during, or after its formation. In the case of the heat convertible resins this should preferably take place prior to any substantial conversion and especially before complete conversion to the insoluble form.

An example wherein a drying oil is incorporated during the initial resinification reaction is as follows:

EXAMPLE 5

Approximately 10 parts of linseed oil were heated to 350° F. in a closed container provided with an agitating device. At this point 25 parts of ethylene glycol were added and the temperature raised to 400° F. Approximately, 0.0040 part of litharge was then added as an accelerator and the mixture held at this temperature (±10° F.) for ½ hour. The ethylene glycol volatilized during this procedure was continuously returned to the reaction vessel by means of a suitable condenser.

The solution was then allowed to cool to 200° F., and 1.7 parts of ethylene glycol, together with 8.6 parts of 4-methyl-Δ4-tetrahydrophthalic anhydride, were added. The temperature was carefully raised to 350° F. over a ½ hour period. At this point a steady stream of $CO_2$ was bubbled through the reacting mixture to remove any water formed during the reaction. The temperature was then raised to 390° F. (±10° F.) and held at approximately that temperature for 10 hours.

The resulting alkyd-type resin was poured while hot into 7.0 parts of xylol, under constant agitation, followed by the addition of 7 more parts of xylol.

Other procedures may be adopted.

The product obtained is a clear varnish possessing excellent coating properties.

Wood or metal panels coated with this varnish air dry in a relatively short period of time to form a hard, mar-resistant, flexible adhering film.

Metal panels, such as for example tin plate, may be coated with this varnish, and if desired the varnish film hardened by baking. A suitable temperature is 350° F. and the panel may be baked at this temperature for a period of 30 minutes to one hour. The film obtained is very hard and mar-resistant, flexible and extensible, and adheres very tenaciously to the metal surface.

Varnishes of this type may be used for either the prime coat or the top coat, or both, or in one or more coats, on food and beverage cans, as for example beer cans, and cans for vegetables and fruits.

Miscellaneous resins

A resin having improved solubility may be prepared by reacting 4-methyl-Δ4-tetrahydrophthalic acid or its anhydride with a substituted polyhydroxy alcohol having at least two hydroxy groups per molecule still available for reaction. As a rule the longer the unhydroxylated chain of such an alcohol the greater the solubility of the resin formed. This applies to both the nonconvertible type of resin and the heat convertible type of resin, to the latter, of course, before its heat conversion.

Examples of substituted polyhydroxy alcohols are the glycerol monomethyl ethers, 1-chloro-propandiol-2,3, glycerol monoethyl ether, a-glycerol phenyl ether, tetrahydrofurfuryl ether of glycerol, mono butyl erythritol, and other similar substituted polyhydroxyl alcohols to which reference has already been made. Resins of good quality and improved solubility are thus produced.

It has been found further that resins of improved solubility and low acid number may be prepared through the reaction of a mixture of any of the polyhydroxy alcohols, or substituted polyhydroxy alcohols, or modified polyhydroxy alcohols, or two or more of the foregoing, with 4-methyl-Δ4-tetrahydrophthalic acid or its anhydride.

A polyhydroxy alcohol which has been heat treated or otherwise polymerized to yield polymeric alcohol or alcohols is considered a modified polyhydroxy alcohol. Examples are polyglycols and polyglycerols, and polymeric forms of substituted polyhydroxy alcohols.

An example of a resin of this character is that produced through the reaction of a mixture of ethylene glycol and glycerine with 4-methyl-Δ4-tetrahydrophthalic anhydride.

Resins having special application in the protective coating field, because of their lower melting points and other desirable properties, may be prepared by reacting mixtures of monohydric alcohols and polyhydric alcohols, including substituted and modified polyhydroxy alcohols, and mixtures of any of the foregoing polyhydroxy alcohols whether substituted or modified or not, with 4-methyl-Δ4-tetrahydrophthalic acid or its anhydride.

An example of a resin of this character is that produced by the reaction of 4-methyl-Δ4-tetrahydrophthalic anhydride with a mixture of glycerol and a relatively small quantity of butyl alcohol.

If desired, the monohydric and polyhydric alcohols may be added in sequence, either immediately in sequence or after the alcohol of the preceding addition has reacted to some extent.

The resulting resins are particularly tough and have excellent coating properties.

Resins having low melting points and other desirable properties may be prepared through the reaction of 4-methyl-Δ4-tetrahydrophthalic acid or its anhydride directly with certain substituted alcohols, for example, alcohol amines such as monoethanol amine, diethanol amine, triethanolamine, and similar compounds, or mixtures of the same.

It has been found possible to produce resins having increased solubility and compatibility, useful generally in coating compositions and particularly in nitrocellulose or other lacquers, by modifying any of the 4-methyl-Δ4-tetrahydrophthalic acid resins described herein with monobasic acids generally. It will, of course, be understood that the treatment of heat convertible resins preferably takes place before any degree of conversion to the insoluble form is effected. With unsaturated monobasic acids, the resins will, in general, also be element convertible as pointed out above under the heading "Element convertible resins."

The lower aliphatic monobasic acids have a pronounced softening action upon the resins hereinbefore described.

The use of alphatic acids from non-drying oils such as stearic, palmitic, oleic, and ricinoleic acids as modifying agents results in the formation of resins of excellent flexibility.

Although the non-drying oils may be used as such, it is preferred generally to use the free acids derived from these oils since it is often difficult to incorporate the glyceride oils in an alkyd resin by direct methods.

Other monobasic acids which may be used to modify the properties of resins described herein include certain natural resins such as rosin, copal, kauri, and the like. The use of these compounds increases the solubility and other desirable properties of the resins.

Resins having particular use in quick drying varnishes may be prepared by modifying any of the resins described herein with a drying oil or oils of a non-acid character. Generally speaking, these oils are synthetically prepared and as a rule are considered to be of hydrocarbon constitution.

Resins having particular application in molding compositions and in the protective coating field may be prepared by modifying any of the resins described herein with other synthetic resins such as synthetic resins of the phenolformaldehyde type, of the urea-formaldehyde type, of the polystyrene type, and of the polyindene type. Resins prepared in this manner possess the superior flexibility of the alkyd-type resins and the hardness of the synthetic resins.

Alkyd-type resins prepared from 4-methyl-Δ4-tetrahydrophthalic anhydride, or the corresponding acid, as for example, resins prepared according to the method disclosed in Example 2, but preferably with the use of shorter heating periods, for example 2 hours, may be readily incorporated in standard varnish or paint formulations. The following is an example:

EXAMPLE 6

| | Parts |
|---|---|
| Resin | 12.2 |
| China-wood oil | 14.0 |
| Solvent naphtha (V. M. & P.) | 26.2 |
| Drier | 1.0 |

The mixture of resin and China-wood oil is heated in a copper vessel to a temperature of 400° F. during a period of 20 minutes. The mixture then is heated to a temperature of 560° F. during a period of 10 minutes, and held at this temperature for an additional period of 3 minutes. It is allowed to cool to 535° F., held at this temperature for a period of 6 minutes, chilled to 400° F. and reduced with solvent naphtha. The drier is stirred into the varnish whenever it reaches room temperature.

The product is a clear, light colored varnish with excellent coating properties.

Standard varnish procedure may be adopted in the preparation of various coating compositions.

It will, of course, be understood that the physical properties of any of the foregoing resins may be modified to a certain extent by variation of the quantities of reactants employed. For instance, one may expect to find some difference in physical properties when the reactants are used in molar quantities on the one hand, and when molar quantities are widely departed from on the other.

In general, at the end of the resin forming reaction any unreacted material is removed such as by distillation.

Furthermore, other materials may be added in any desired proportion to the reaction. As an example, maleic anhydride, phthalic anhydride, or similar substances may be added at any stage of the resinification reaction without departing from the general principles of the invention.

Moreover, since isoprene fractions employed in the manufacture of methyl tetrahydrophthalic anhydride may contain other unsaturated materials capable of reacting with maleic anhydride to form adducts, which in turn are capable of forming resins with polyhydric alcohols, so that the overall reaction results in mixed resins, the invention in its broadest aspects is intended to cover such procedure and the products obtained.

An example of a material which might be present in an isoprene fraction is a lesser quantity of piperylene. As described and claimed in my copending application Serial Number 244,349, filed Dec. 7, 1938 this material is capable of reacting with maleic anhydride to form a compound which in turn reacts with polyhydric alcohols generally to form resins.

When this material is present in the isoprene a mixed resin is obtained.

Resins prepared in accordance with my invention are useful generally in coating compositions for application to all types of materials whether of metal, wood, glass, ceramic substances or otherwise.

Such coating compositions may be made by merely dissolving any of my resins in a suitable solvent of which benzene, toluene, xylene, ethyl benzene, solvent naphtha, petroleum naphtha, carbon tetrachloride, decalin, triethylbenzene and ethylene dichloride are examples.

On the other hand, my resins may be incorporated in varnishes as illustrated above or in paints, lacquers, enamels, or other coating materials.

These coating materials are useful in coating metal beverage and food containers such as the container commonly known as the tin can. This applies particularly to coating compositions made by dissolving my resins in solvents or by incorporating my resins in varnishes. The adherence to the metal is unusually tenacious.

The term resin modifying agent as used herein is in general intended to mean an agent which is added to modify the resin resulting from reacting a polyhydric alcohol with 4-methyl-Δ4-tetrahydrophthalic acid or anhydride or a mixture of the two.

The resin modifying agents particularly described herein, include monobasic acids generally. Among these monobasic acids are the unsaturated and saturated acids obtained from drying oils, non-drying oils, and natural resins, as well as the drying oils, non-drying oils and natural resins themselves.

Resin modifying agents disclosed herein also include the monohydric alcohols whether substituted or not.

Other synthetic resins and non-acid drying oils are also included.

Whereas, the monobasic acids and the monohydric alcohols are largely employed to directly modify the reaction product of a polyhydric alcohol and 4-methyl-Δ4-tetrahydrophthalic acid or anhydride, in the case of other synthetic resins or non-acid drying oils the addition may be made either directly, or with or without, or before or after, the addition of monobasic acid or monohydric alcohol.

Further, synthetic resin and non-acid drying oil may each be added without the other.

In general, the modifying agents are added before or during the initial resinification. However, in certain cases, such as with other synthetic resins, or non-acid drying oils, or both, the addition may be made, if desired, after the initial resinification reaction is complete, in which case steps are preferably taken such as by heating to cause a secondary resinification reaction to take place. When both synthetic resin and non-acid drying oil are employed, the addition of synthetic resin may precede or follow or be made simultaneously with the addition of non-acid drying oil.

In the specification and in the claims, the following terms have the following meanings:

The term "4-methyl-Δ4-tetrahydrophthalic acid" is intended to embrace the acid or its anhydride or a mixture of the two.

The term "polyhydric alcohol," or its equivalent, as used in the specification and in the claims, is intended to embrace any organic compound containing at least two hydroxyl groups each of which is attached to a carbon atom which is non-aromatic in nature. By the term carbon atom which is non-aromatic in nature is meant a carbon atom which is not contained in a homocyclic or heterocyclic aromatic ring.

By the term "substituted glycol" is meant any polyhydric alcohol containing only two hydroxyl groups and at least one other substituent group such as ether, ester, amino, aldehyde, ketone, or halogen.

By the term "modified glycol" is meant a compound obtained by the polymerization or condensation or any polyhydric alcohol containing only two hydroxyl groups.

By the term "substituted compound having more than two hydroxyl groups" is meant a polyhydric alcohol containing more than two hydroxyl groups and at least one other substituent group such as ether, ester, amino, aldehyde, ketone or halogen.

By the term "modified compound having more than two hydroxyl groups" is meant a compound obtained by the polymerization or condensation of any polyhydric alcohol containing more than two hydroxyl groups.

The term "monohydric alcohol" or its equivalent, as used in the specification and in the claims, is intended to embrace any organic compound containing only one hydroxyl group attached to a carbon atom which is non-aromatic in nature. By the term "carbon atom which is non-aromatic in nature" is meant a carbon atom which is not contained in a homo-cyclic or heterocyclic aromatic ring.

While resins of particular types and procedures for the purpose of preparing such resins have been particularly described, it is to be understood that this is by way of illustration only. Therefore, changes, omissions, additions, substitutions and/or modifications might be made within the scope of the claims without departing from the spirit of the invention.

I claim:

1. A synthetic resin comprising the reaction product of a polyhydric alcohol, the adduct of maleic anhydride with an isoprene fraction containing up to 90% isoprene and derived from light oil obtained in the manufacture of combustible gas and in which fraction isoprene is the predominant diolefine constituent, and at least one of a group consisting of drying oil and drying oil acid.

2. A synthetic resin comprising the reaction product of ethylene glycol, the adduct of maleic anhydride with an isoprene fraction containing up to 90% isoprene and derived from light oil obtained in the manufacture of combustible gas and in which fraction isoprene is the predominant diolefine constituent, and at least one of a group consisting of drying oil and drying oil acid.

3. A synthetic resin comprising the reaction product of glycerol, the adduct of maleic anhydride with an isoprene fraction containing up to 90% isoprene and derived from light oil obtained in the manufacture of combustible gas and in which fraction isoprene is the predominant diolefine constituent, and at least one of a group consisting of drying oil and drying oil acid.

4. A process for the preparation of a synthetic resin comprising reacting a polyhydric alcohol, the adduct of maleic anhydride with an isoprene fraction containing up to 90% isoprene and derived from light oil obtained in the manufacture of combustible gas and in which fraction isoprene is the predominant diolefine constituent, and at least one of a group consisting of drying oil and drying oil acid.

5. A process for the preparation of a synthetic resin comprising reacting ethylene glycol, the adduct of maleic anhydride with an isoprene fraction containing up to 90% isoprene and derived from light oil obtained in the manufacture of combustible gas and in which fraction isoprene is the predominant diolefine constituent, and at least one of a group consisting of drying oil and drying oil acid.

6. A process for the preparation of a synthetic resin comprising reacting glycerol, the adduct of maleic anhydride with an isoprene fraction containing up to 90% isoprene and derived from light oil obtained in the manufacture of combustible gas and in which fraction isoprene is the predominant diolefine constituent, and at least one of a group consisting of drying oil and drying oil acid.

FRANK J. SODAY.